(12) United States Patent
Nichani

(10) Patent No.: US 6,819,779 B1
(45) Date of Patent: Nov. 16, 2004

(54) LANE DETECTION SYSTEM AND APPARATUS

(75) Inventor: Sanjay Nichani, Natick, MA (US)

(73) Assignee: Cognex Corporation, Natick, MA (US)

( * ) Notice: Subject to any disclaimer, the term of this patent is extended or adjusted under 35 U.S.C. 154(b) by 744 days.

(21) Appl. No.: 09/721,311

(22) Filed: Nov. 22, 2000

(51) Int. Cl.$^7$ .................................................. G06K 9/00
(52) U.S. Cl. .................................................. 382/104
(58) Field of Search .............................. 382/104, 105, 382/199, 218, 286, 288, 291; 348/118, 135, 143, 148; 340/901, 903, 905, 935, 937, 939, 995.13, 988; 701/80

(56) References Cited

U.S. PATENT DOCUMENTS

| | | | |
|---|---|---|---|
| 4,970,653 A | 11/1990 | Kenue | 701/301 |
| 5,075,864 A | 12/1991 | Sakai | 701/217 |
| 5,208,750 A | 5/1993 | Kurami et al. | 701/28 |
| 5,301,115 A | 4/1994 | Nouso | |
| 5,529,138 A | 6/1996 | Shaw et al. | 180/169 |
| 5,555,312 A | 9/1996 | Shima et al. | 382/104 |
| 5,581,250 A | 12/1996 | Khvilivitzky | 340/961 |
| 5,642,093 A * | 6/1997 | Kinoshita et al. | 340/439 |
| 5,642,106 A | 6/1997 | Hancock et al. | 340/988 |
| 5,706,355 A | 1/1998 | Raboisson et al. | 382/104 |
| 5,835,028 A * | 11/1998 | Bender et al. | 340/937 |
| 5,917,937 A | 6/1999 | Szeliski et al. | 382/154 |
| 5,961,571 A | 10/1999 | Gorr et al. | 701/207 |
| 6,091,833 A * | 7/2000 | Yasui et al. | 382/104 |
| 6,133,824 A * | 10/2000 | Lee et al. | 340/435 |
| 6,141,435 A * | 10/2000 | Naoi et al. | 382/104 |
| 6,212,287 B1 * | 4/2001 | Olivieri et al. | 382/104 |
| 6,429,789 B1 * | 8/2002 | Kiridena et al. | 340/905 |
| 6,546,118 B1 * | 4/2003 | Iisaka et al. | 382/104 |
| 6,591,000 B1 * | 7/2003 | Oike et al. | 382/104 |

OTHER PUBLICATIONS

Massimo Bertozzie, et al., "*GOLD: A Parallel Real–Time Stereo Vision Systems for Generic Obstacle and Lane Detection*", IEEE Transactions on Image Processing, vol. 7, No. 1, Jan. 1998, pp 62–65.

Q.T. Luong, et al., "*An integrated Stereo–based Approach to Automatic Vehicle Guidance*", IEEE, 1995, pp 52–57.

Ernst D. Dickmanns, et al., "*Recursive 3–D Road and Relative Ego–State Recognition*", IEEE, 1992, 2 pages.

* cited by examiner

Primary Examiner—Andrew W. Johns
Assistant Examiner—Shervin Nakhjavan
(74) Attorney, Agent, or Firm—Brian Michaelis

(57) ABSTRACT

A method of detecting a road lane in an electronically stored image. An image acquisition device acquires an image of a road lane environment and stores the image as an array of pixels. An edge detector generates a list of feature edges form the image. Lane marker edge pairs are filtered from the list of features according to a set of criteria. Lane marker edge pairs are sorted into lists corresponding to individual lane markers. Individual lane markers defining a left and right boundary of a road lane are geometrically identified. Three dimensional curves are fit along centers of mass of the sets of left and right lane markers to model a road lane boundary.

15 Claims, 6 Drawing Sheets

LANE DETECTION SYSTEM AND APPARATUS

FIELD OF THE INVENTION

The present invention relates to road navigation systems and more particularly to road lane detection systems.

BACKGROUND OF THE INVENTION

Automated road navigation systems provide various levels of assistance to automobile drivers to increase safety and reduce driving effort. Road navigation systems use various types of sensors to determine the type, location and relative velocity of obstacles in a vehicles path or vicinity. The sensors gather relevant information about a vehicle's surrounding environment. The information from sensors must be rapidly processed to determine whether a system should influence control of a vehicle or alert a driver to a dangerous condition.

Various systems have been developed which use active techniques such as radar, lasers or ultrasonic transceivers to gather information about a vehicle's surroundings for automated navigation systems. For example, various adaptive cruise control methods use Doppler radar, lasers or ultrasonic transceivers to determine the distance from a subject vehicle to the vehicle traveling before it along a road. These systems are classified as "active" systems because they typically emit some form of energy and detect the reflected energy or other predefined energy emitters. Active systems are susceptible to interference from other similar active systems operating nearby. Emitted energy can be reflected and scattered by surrounding objects thereby introducing errors into the navigation system. For example, the space between a vehicle and the ground can act as a wave-guide to certain active signals thereby distorting any reflected signal and providing a source for errors. Active systems also consume substantial electrical power and are not well suited for adaptation to an existing infrastructure, i.e. the national highway system.

The most relevant information for an automated navigation system is typically the same information used by human drivers, that is, visual, audible and acceleration measurement data. This is because the road and highway infrastructure was designed and constructed to provide clear information and guidance to human drivers who can naturally detect such data.

Passive systems such as optical systems typically detect energy without first emitting a signal, i.e., by viewing reflected or transmitted light. Certain passive systems such as optical systems advantageously are more suited to sensing signals which were designed for a human observer because they more closely emulate human vision. Optical detection systems typically perform extensive data processing roughly emulating human vision processing in order to extract useful information from incoming optical signal. Automated navigation systems using optical systems must solve a variety of processing tasks to extract information from input data, interpret the information and trigger an event such as a vehicle control input or warning signal to an operator or other downstream receivers.

Vehicle navigation systems comprise a variety of interdependent data acquisition and processing tasks to provide various levels of output. Road navigation systems may, for example, include adaptive cruise control, obstacle detection and avoidance, multi-vehicle tracking and lane detection. Adaptive cruise control may provide a warning signal or stimulate other operations which would adjust a vehicle's speed to maintain relative separation between a leading and a following vehicle. Obstacle detection and avoidance may alert a driver or alter a vehicle's course to avoid obstacles or obstructions in the road. Multi-vehicle tracking may provide information regarding traffic in other lanes which may be useful for any number of navigation or collision avoidance tasks.

Lane detection is loosely defined as determining where the left and right lanes are located relative to a vehicle. This is achieved by finding lane markers (portions of lanes or complete lanes) and then classifying them as left or right. Lane detection also may be used as a component of adaptive cruise control, multiple-vehicle tracking, obstacle avoidance and lane departure warning systems. Similarly, some of the functions necessary for obstacle detection may provide useful image information (i.e., features) which can be further processed for lane detection without having to re-process each image again to detect such features.

Earlier solutions to lane detection from an image have been computationally slow and also susceptible to confusion from spurious roadway markings. Because of naturally occurring distance perspective, parallel lines on a road plane beneath the viewer and along the direction of travel tend to converge at the horizon. Some lane detection implementations attempt to convert the image into a space in which the lines are equal width and equal distance from each other over relatively large distances, i.e., a "bird's eye view." This may simplify the recognition of what should then appear as parallel lines, however the effort necessary to perform this transformation for every point in an image is largely wasted effort. In fact, some implementations actually map every point of the image to the birds-eye view, regardless of whether it could possibly correspond to a lane marker. See, for example, Massimo Bertozzi, GOLD: A Parallel Real-Time Stereo Vision System of Generic Obstacle and Lane Detection, IEEE Transactions on Image Processing, Vol. 7, No. 1, January 1998.

Other implementations require 3-D processing which not only doubles the cost of the cameras, but also the necessary processing to detect the basic features, not to mention the processing to perform the necessary correspondence solution prior to beginning to detect whether the objects are lane markers. Another problem in the prior art is the inability to cope with the normally occurring elements in a roadway image, such as shadows on the road, skid marks, old and misleading paint marks, or pavement lines that may not be aligned with the travel lane.

SUMMARY OF THE INVENTION

The present invention includes a method and apparatus for detecting road lane markings in a machine vision system. A video camera is mounted to a subject vehicle and provides frames of image data to an image processor. The camera uses perspective geometry to relate images in a 3D world coordinate system to a 2D image coordinate system. The invention accounts for the perspective geometry using a dynamic thresholding scheme.

An algorithm recursively computes lane marker width in pixels for each image row, given the lane width in pixels of the bottom-most (i.e., "nearest") rows. The expected lane marker width can be pre-computed and stored in a table as a function of a row number. Similarly, a table of lane widths (i.e., distance between adjacent lane lines) as a function of rows may be computed and stored in a table. The 2D image data is processed on a row-by-row basis to produce a set of dense points along the boundary of the lane marker.

A feature edge-detection algorithm produces a list of connected edgelets (chains). Features that are associated with sufficiently long chains are processed further. The feature edge detection algorithm creates a list of edges for all features detected in the image, characterized by location, size, and direction. The list of edges is then reorganized in a row-by-row fashion and a list of edges for each image row is indexed by row number.

A lane marker detection component evaluates lane marker edges from the list of all feature edges. The lane marker detection algorithm loops through data corresponding to each row of an image and compares each possible combination of edges in a given row with a set of three criteria to determine whether the edge is associated with a lane marker or some other feature. The three criteria are: width between edge pairs of the markers, opposite orientation of the intensity gradient angles of the edges, and absolute gradient angle orientation of the pair of edges. An image gradient angle represents the direction of the gradient change in intensity.

Pairs of edges that meet all three criteria are appended to the lists of detected lane markers according to their xy location in the image.

Each detected lane marker having a list of marker edge pairs that are nearly contiguous in a vertical direction, and that have sufficient overlap in the horizontal direction is deemed a valid lane marker. The system then calculates a center of mass and principal axis of each valid lane marker. A lane detection process then determines which markers belong to the left lane and which markers belong to the right lane according to their respective axis alignment.

Once a set of lane markers that constitute a particular lane line is known, then all the points are available for fitting a 2D curve to mathematically model the boundaries of a lane. Such a system could be used for lane departure warning. If the 3D coordinates of the points are known, then a plane can be fit to find the ground plane and a 3D curve description can also be obtained. Such a system could be used for assisting in other road navigation functions such as adaptive cruise control, for example.

Features of the present invention include a passive method and apparatus for road lane detection having little or no susceptibility to interference from other nearby systems and having low power requirements. The invention provides the capability to quickly reject false lane markings based upon their size, shape, color, alignment with each other, and horizontal location with respect to other markers and corresponding lane lines. Unlike earlier systems, the present invention avoids the computational complexity of mapping the entire image to an orthogonal projection. Similarly, the present invention does not require constant-width "calipers" to be applied to the image processing to detect line-shaped objects. Still further features of the present invention include a method of detecting road lanes that is not susceptible to false alarms from detecting roadside objects and that process information rapidly and robustly. Part of the robustness is derived from the ability of the invention to reject false markings such as tire marks or inappropriate lane markings.

Additional features of the present invention include a road lane detector having high density row-by-row image processing thereby allowing flexibility in choosing a lane model and which implicitly accounts for perspective distortion. Still further additional features of the present invention includes a method of road lane detection that is capable of operating with a monocular camera and that readily integrates with existing road navigation systems. A binocular camera system implementation would further enhance the capabilities. Furthermore, the invention produces results comprising a 2-D or 3-D curve definition which can greatly simplify further processing by downstream systems.

BRIEF DESCRIPTION OF THE DRAWINGS

These and other features of the present invention will be better understood when reading the following description taken together with the accompanying drawings.

DETAILED DESCRIPTION OF THE INVENTION

Figure 1:
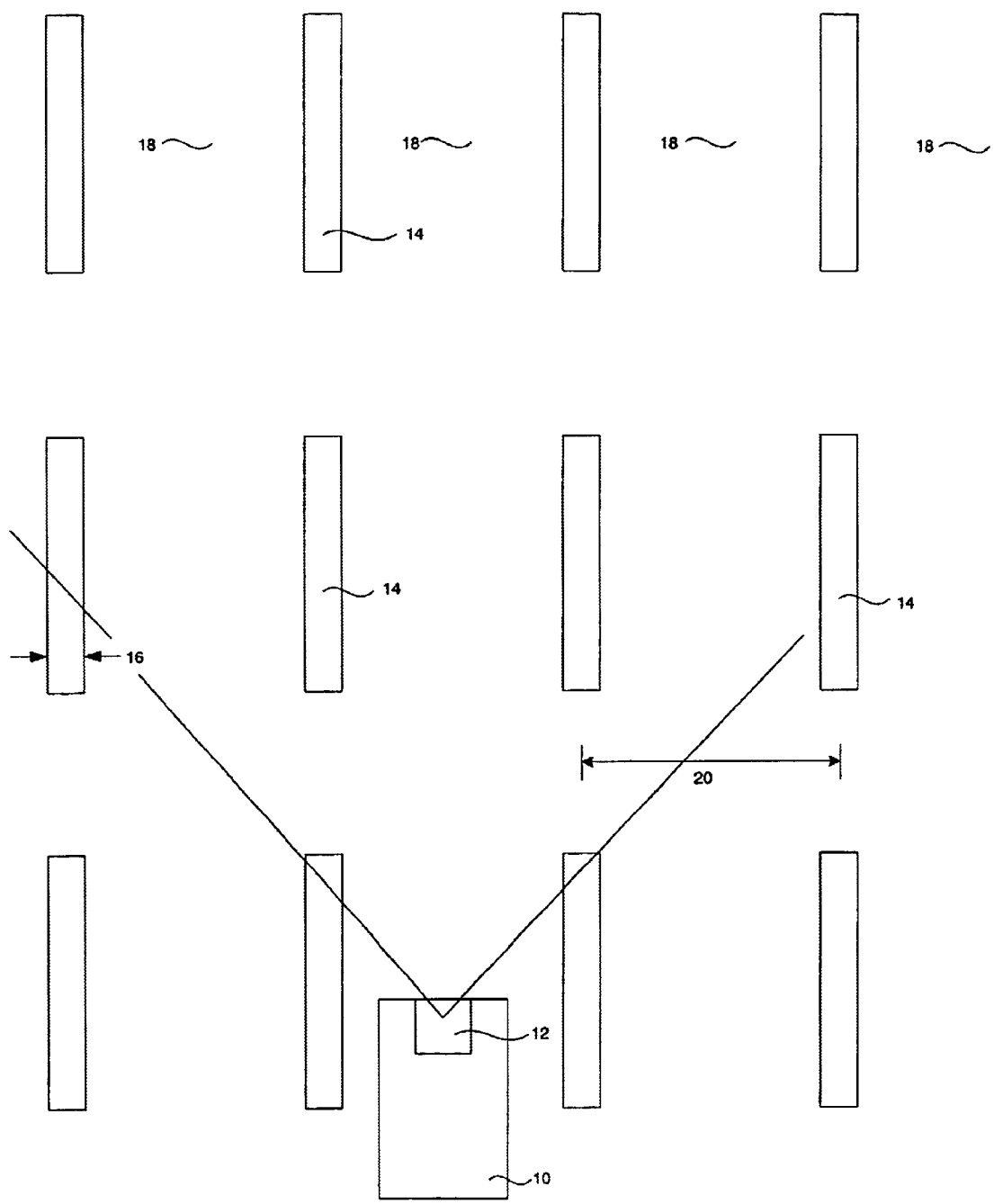
FIG. 1 is a top view of a vehicle having a camera for lane detection and illustrates lanes and lane markers according to at least one embodiment of the present invention.

Referring first to FIG. 1 a vehicle 10 is illustrated on a road having multiple lanes 18 and lane markers 14 which define the lanes 18. A camera 12 is mounted to the vehicle 10 so that approaching lane markers 14 are located in the camera's viewing area. Each lane 18 has a width 20 which is typically standard and static. Likewise, each lane marker 14 has a width 16 which is typically standard and static (e.g. four to six inches wide), and periodicity (e.g. solid or segmented with 10 foot segments and 30 foot spaces).

Figure 2:
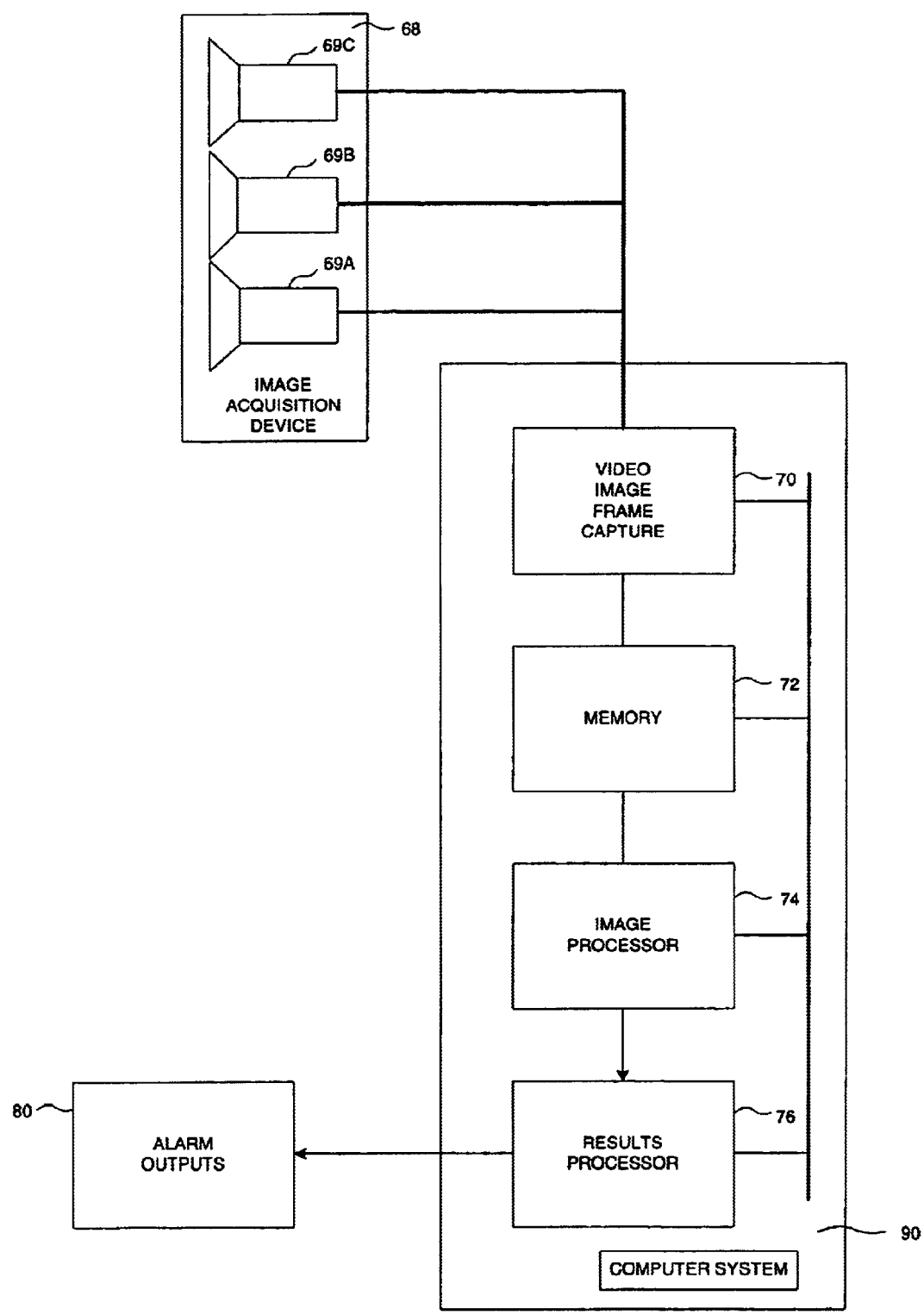
FIG. 2 is a block diagram of an apparatus for implementation of an illustrative embodiment of the present invention.

FIG. 2 illustrates an embodiment of an apparatus implementing the present invention, including an image acquisition device 68 (i.e., a camera unit), a video image frame capture device 70, memory 72, an image processor device 74, and a results processor 76, each component being in electrical communication as further described below. The results processor 76 communicates with any output devices such as an alarm output 80. The illustrative embodiment may be implemented using a general purpose processor, such as a personal computer, having commercial, off-the-shelf features for video capture, graphical user interface, and output signaling.

According to the invention, the image acquisition device 68 contains one or more video cameras 69a, 69b, 69c or digital cameras, arranged to view a target scene, such as out the front windshield of a motor vehicle. The image acquisition device 68 passes the resulting video output signal (which would include a signal from each camera) to a computer 90 for further processing. The video output signal is connected to the input of a video processor adapted to accept the video signals, such as a frame capture sub-system 70. Video images from each camera are then sampled (synchronously, if more than one camera), captured, and stored in a memory 72 associated with a general purpose processor. Generally, digitized video image sets 20 from the video image capture device 18, such as a Cognex 8100 Multichannel Frame Grabber, available from Cognex Corp., Natick, Md., or other similar device, are stored into the memory device 72. The digitized image in the form of pixel information can then be stored, manipulated and otherwise processed in accordance with capabilities of the vision system. The digitized images are accessed from the memory 72 and processed according to the invention, under control of a computer program. Output information may be further processed by a results processor sub-system 76, for example, and used to trigger output actions such as alarm outputs 80.

Figure 3:
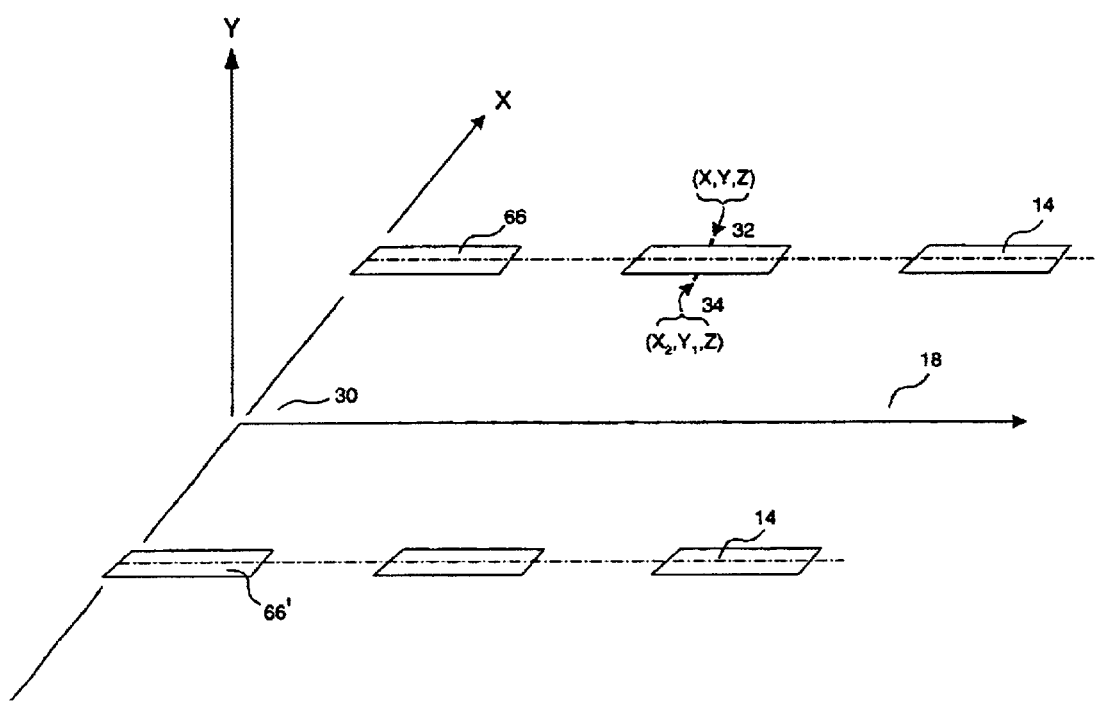
FIG. 3 illustrates lane markers and lanes relative to a world coordinate system according to at least one embodiment of the present invention.

FIG. 3 illustrates several lane markers 14 and a road lane 18 relative to a world coordinate system 30 having an origin derived from the camera location. It can be seen that the road lane 18 and lane markers 14 lie generally parallel to the X-Z plane. A first exemplary boundary point 32 on a lane marker 14 is illustrated having world coordinates ($X_1$, $Y_1$, Z). A second exemplary boundary point 34 on a lane marker 14 is illustrated having world co-ordinates ($X_2$, $Y_1$, Z).

Figure 4:
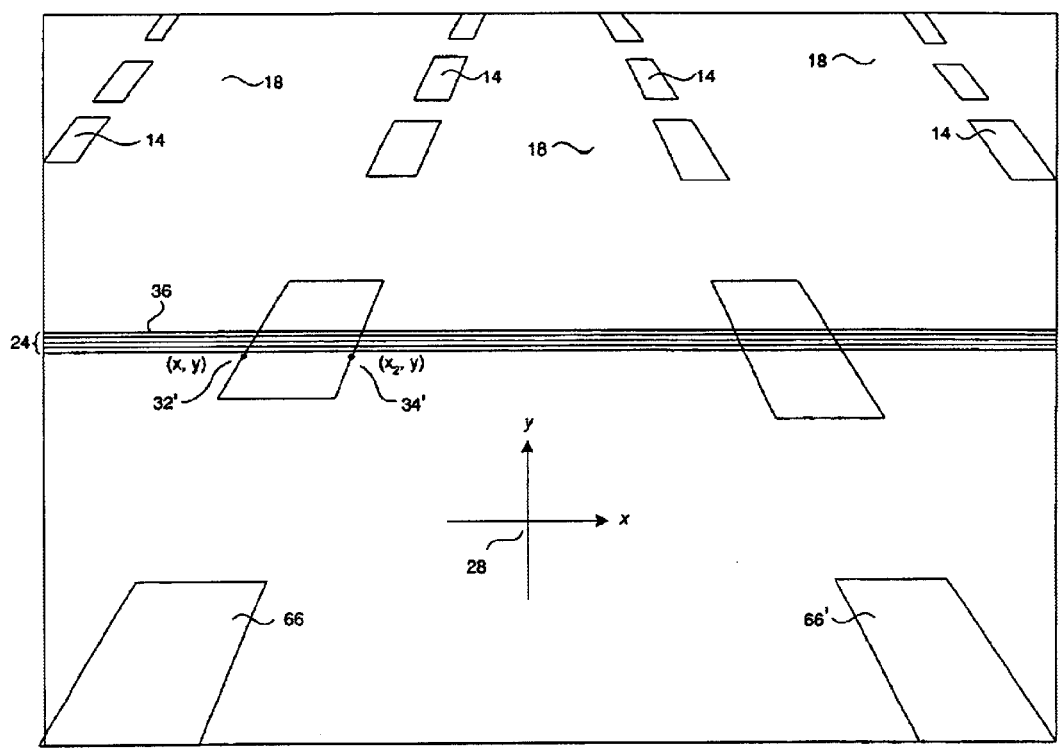
FIG. 4 illustrates lane markers and lanes relative to an image coordinate system according to at least one embodiment of the present invention.

FIG. 4 illustrates several lane markers 14 and road lanes 18 relative to a 2D image coordinate system 28. An image 22 is illustrated and several rows 24 of image pixels 36 are shown wherein the rows are oriented parallel to the X axis in the image coordinate system. The first exemplary edge point 32' is represented in the image coordinate system by co-ordinates ($x_1$, y). The second exemplary edge 34' represented in the image coordinate system by coordinates $x_2$, y).

It is well known to represent images in a microprocessor system as an array of data in computer memory wherein the shade of each pixel is represented by a number in a computer memory address. In an illustrative embodiment of the present invention each pixel of an image is represented in an 8 bit memory space by a number corresponding to one of 256 shades of gray. Edge detection provides edges by selecting points in the image where the gradient magnitude is significant. The gradient angle is the direction of this gradient.

Figure 5:
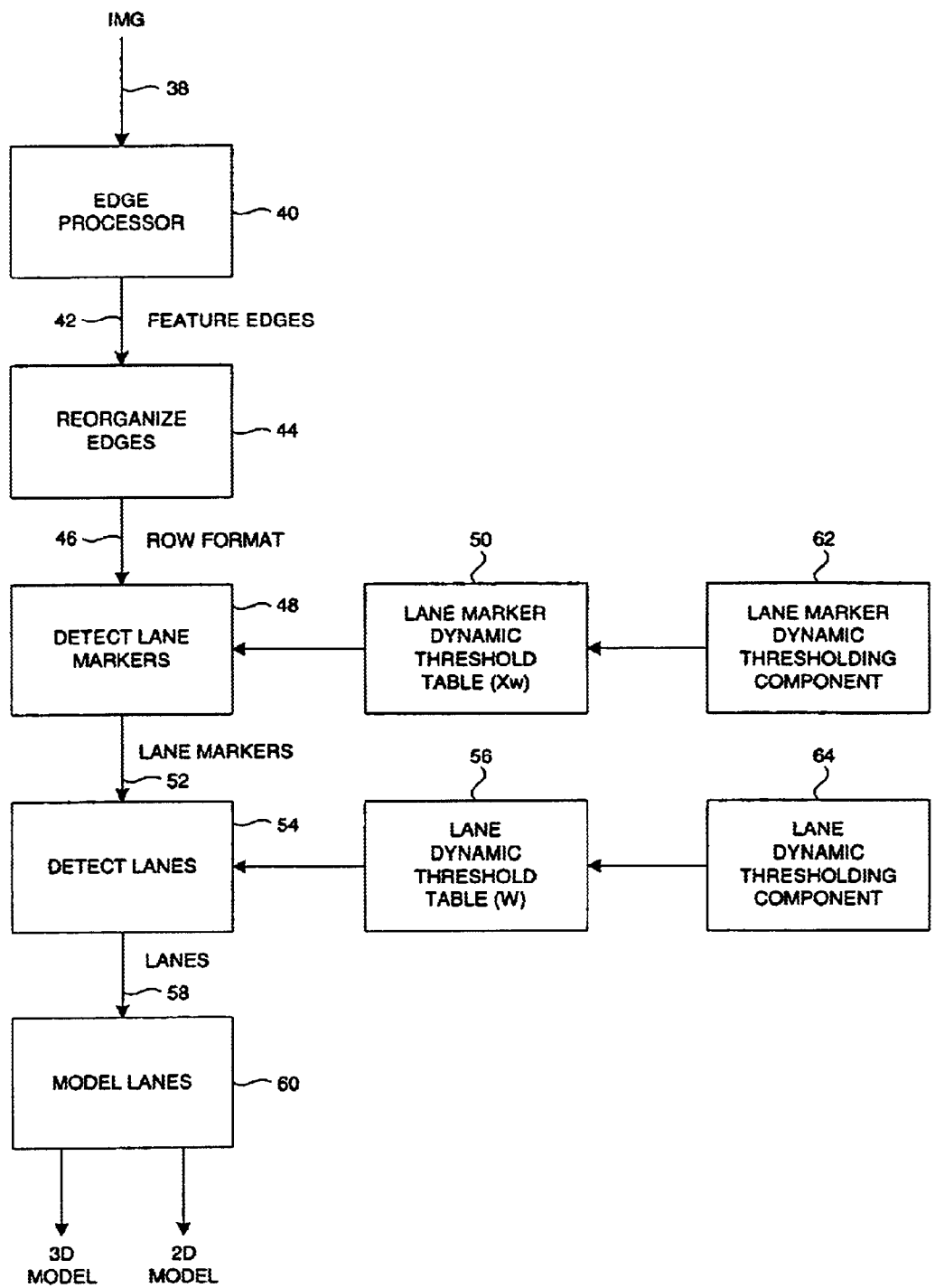
FIG. 5 illustrates a block diagram of a lane detection image processing system according to at least one embodiment of the present invention.

FIG. 5 is a block diagram of the various components of an image processor in an illustrative embodiment of the present invention. An edge processor 40 operates on image data 38 to distinguish features in an image. An illustrative embodiment of the invention uses a Patmax-style feature detection scheme using parabolic smoothing, non-integral subsampling at a specific granularity and Sobel Edge detection followed by true peak detection and finally chaining.

The edge processor 40 outputs a list of feature edges 42 which is passed to an Edge List Re-organizer component 44. The Edge List Re-organizer component 44 organizes the edge list 42 into a row format 46 corresponding generally to rows 24 in the image coordinate system 28. A list of feature edges in row format 46 is passed to a Lane Marker Detector component 48.

The Lane Marker Detector component 48 operates on the list of edge features in row format 46 to distinguish feature edges corresponding to lane markers. Each row of the list of feature edges 46 is processed wherein every possible pairwise combination of edges in each row is tested against a set of criteria to determine whether they may correspond to boundaries of a lane marker 14.

The first criterion is a relative width constraint. Any pair-wise combination of feature edges that corresponds to a pair of lane marker edges is expected to be separated by a distance approximately equal to a threshold width of a lane marker in image space for its specific row, taking perspective geometry into account.

According to a dynamic thresholding scheme, a threshold width of lane markers for each row is pre-calculated and stored in a dynamic thresholding table 50. The dynamic thresholding scheme transforms 3D coordinates in the world coordinate system 30 into 2D coordinates in the image coordinate system 28 and calculates lane marker width thresholds for each given row.

The following explains the operation of the dynamic thresholding scheme. Referring again to FIGS. 3 and 4, it is assumed that a 3D world coordinate system 30 has its origin at the center of a 2D image 22, Y axis along image pixel columns and Z axis normal to the image 22 plane. It is further assumed that the road plane is below the camera elevation and parallel to the XZ plane. By perspective geometry, the transformation from world coordinates (X, Y, Z) to image coordinates (x, y) is given by:

$$x = X*f/Z + xc,$$

$$y = Y*f/Z + yc$$

where f is the focal length of camera 12 and (xc, yc) is the center row of the center column of the image 22.

To compute a lane marker width threshold for a given row, a Dynamic Thresholding component 62 considers two points on a lane marker at the same image perspective depth. For example, consider the first exemplary edge point 32 and second exemplary edge point 34. The world coordinates for each point are ($X_1$, Y, Z) and ($X_2$, Y, Z) respectively. The lane marker width is the difference between the X values of each of the edge points which corresponds to $Xw = X_2 - X_1$. Transforming to image coordinates:

$$x_1 = X_1*f/Z + xc,$$

$$\text{and } y_2 = Y_2*f/Z + xc$$

Therefore the lane marker width in image space as a function of Z is:

$$xw = x_2 - x_1 = Xw*f/Z$$

However, it is still necessary to determine the lane marker width as a function of y in the image coordinate system. If the y coordinate is decreased by an incremental amount, dy, then the corresponding depth at which the lane marker points now lie in the world coordinate system is changed to Z'.

Therefore: $y - dy = Y*f/Z' + yc;$ and accordingly: $(y - dy - yc)/(y - yc) Z/Z'$ Therefore the lane marker width in image coordinates at the new depth, Z', is given by:

$$xw = Xw*f/Z' = Xw*f/Z*(Z'/Z)$$

or $xw' = xw*(y - yc/y - dy - yc)$ and specifically where dy=1, $xw' = xw*(y - yc/y - 1 - yc)$ Accordingly, the lane marker width for a particular row number of an image (y coordinate in image space) equals the lane marker width of the previously considered row times a perspective factor wherein the perspective factor equals the previous row number minus a quantity (center row number divided by previous row number) minus one minus the center row number.

This provides a formula for recursively computing the lane marker width for each decreasing row value given the lane marker width in pixels for the bottom-most row. These values are pre-computed and stored in a Lane Marker Dynamic Threshold Table 50 indexed by row number. The Lane Marker Dynamic Threshold Table 50 provides the lane marker width threshold values to the Lane Marker Detector Component 48 as a first criterion for finding edge pairs that correspond to lane marker boundary points from a list of feature edges.

Figure 6:
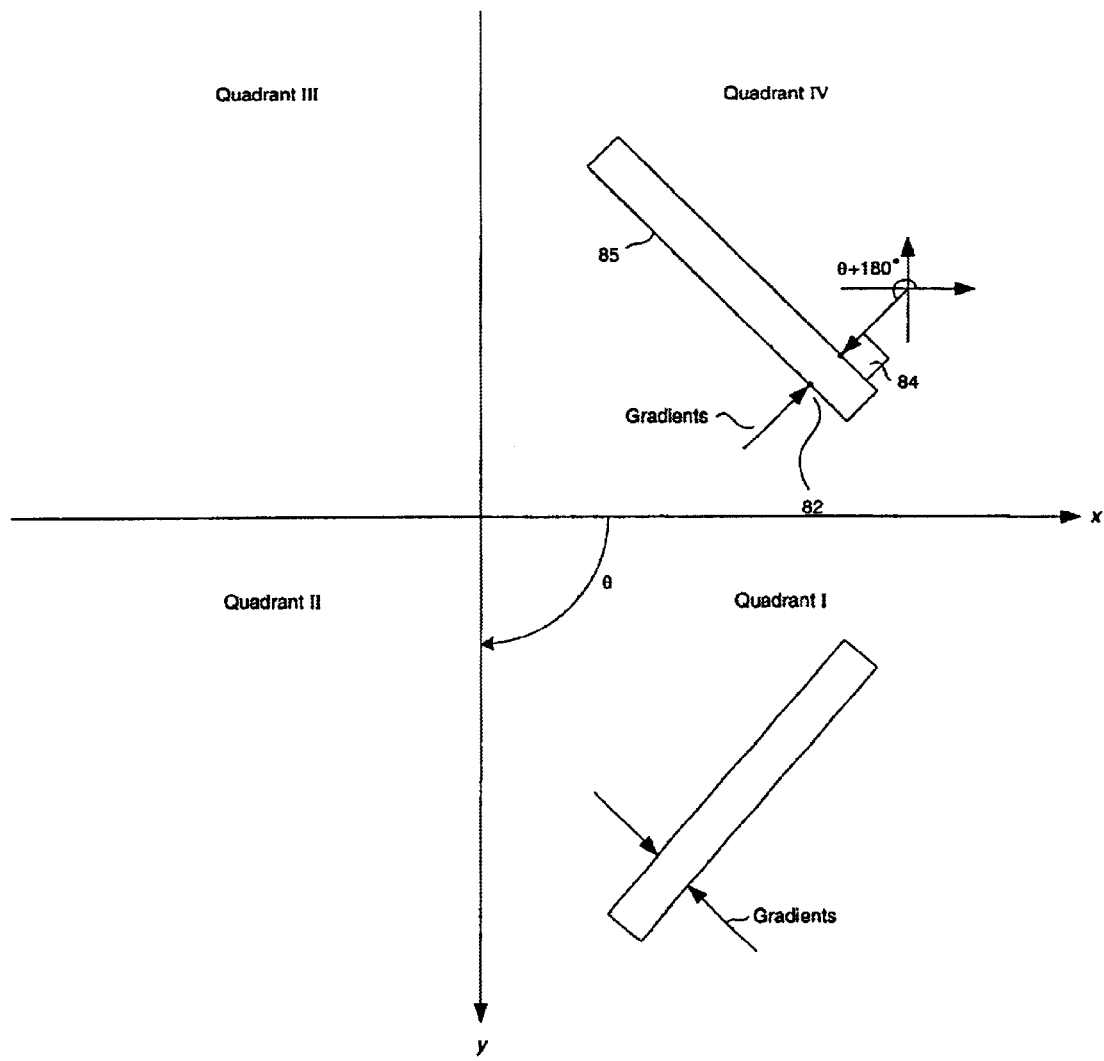
FIG. 6 illustrates a graphical diagram relating gradient angles to graphical quadrants according to at least one embodiment of the present invention.

The second criterion is a relative angle constraint. The intensity gradient angle of the two edge should differ by approximately 180°. FIG. 6 show a number of lane markers 85, each being a light mark on a dark roadway background. An exemplary left edge lane marker boundary point 82 is compared to a corresponding exemplary left edge lane marker boundary point 84. The gradient angle of exemplary point 82 is 180 degrees apart from the gradient angle of exemplary point 84 so this pair of points meets the relative angle criterion.

The third criterion is an absolute angle constraint. Referring again to FIG. 6, it will be seen that a feature at the left most edge of a lane marker 85 should have a gradient angle θ in the first or fourth quadrant. The third criterion can be tested using the following simple algorithm:

if (edgea.x<edgeb.x)

flag=(((edgea.ang>=0)&& (edgea.ang<90)||(edgea.ang>=270));

else flag=(((edgeb.ang>=0)&& (edgeb.ang<90)||(edgeb.ang>=270));

In other words, the algorithm first compares the x coordinate of each of the edge features under consideration to determine which is the left-most, i.e., has the lower x coordinate. The gradient angle θ of the left-most feature is then tested to determine if it falls between 0 degrees and 90 degrees (greater than or equal to 0 degrees and less than 90 degrees) or is greater than or equal to 270 degrees. If the gradient angle under consideration falls within the specified limits the algorithm returns a boolean true, i.e. the pair of edges under consideration satisfies the third criterion. This functional implication is based upon the observation that a white marker on a darker roadway requires that the angle of the left-most edge of the pair under consideration must be either in the first quadrant or the fourth quadrant, knowing that the gradient angle is perpendicular to the feature angle. This rule eliminates dark marks that happen to be the same width as the lane markers.

If the pair of edges under consideration satisfies all of the above constraints the pair of edges is appended to a list of existing markers. The algorithm iterates through all previously detected lists of lane markers to detect whether the pair belongs to any list. If a row value (in the y direction) of a particular pair of edges corresponds closely to the bottom-most row of the marker, and if there is sufficient x overlap with the bottom-most row of the marker, then the pair is added to the list of edges for that particular marker. If a pair of edges can not be attached to any of the markers, a new individual lane marker is initiated.

Once the lane markers are detected, i.e. a list of edges for all lane markers is determined, the center of mass and principal axis of each lane marker is computed and stored. A line-fitting technique can be used to determine the principal axis of the segment by finding the line that minimizes the perpendicular distance from the line to the edges. The lists of individual lane marker edges 52 are passed to a Lane Detector Component 54. The Lane Detector Component 54 eliminates spurious lane markers, groups markers into sets such that one set corresponds to the right lane and one set corresponds to the left lane.

The Lane Detector Component 54 selects two lane markers nearest to the subject vehicle 66, 66' from the list of individual lane marker edges 52, selects the additional lane markers that are in line with the nearest two lane markers 66, 66', and constructs lane boundaries by constructing a line between the centers of mass of each lane marker in line with the nearest two lane markers.

The Lane Detector Component 54 results in two sets of markers which, along with center of mass data and principal axis data for each lane marker, define the subject vehicle's lane in the image. This image information can then be used to fit a 2-D mathematical model for the lane lines. The Lane Modeling Component 60 fits a 2D curve such as a piecewise linear fit, bezier fit, spline or clothoid to further define each lane boundary. Once the markers that constitute the set of left lane markers and the set of right lane markers are obtained, the mathematical model can be used to provide a more accurate estimation and to fill in any gaps by obtaining 2-D points anywhere, for example between markers.

For a system which has multiple cameras for deriving the lane indications in 3-D, the previously described processing is carried out separately on the image in each channel (e.g., right and left, or top and left). Then the correspondence between markers and lines of markers is done on a marker-by-marker basis. This also permits disparity information to be obtained for each of the lane points.

One method of computing correspondence between lane markers in a left and right image involves considering all possible combinations of correspondences. A matrix can be constructed that defines every combination of lane marker pairs wherein lane markers of one image define matrix columns and lane markers of the other image define matrix rows. For example, if there are m markers in the left image and n markers in the right image then an m x n matrix is formed wherein each element in the matrix represents a potential correspondence. A score is computed for each possible correspondence based on the overlap between markers. If the correspondence is correct, the marker will completely overlap in y but will be shifted in x. The shift in x is the image disparity which is inversely proportional to depth. Since the minimum and maximum disparity are known, the markers are expected to eventually overlap-within the particular range in x. In other words, if the left marker is slid to the right within the known disparity range it should overlap the corresponding marker.

The maximum overlap may be computed in a number of ways including overlap of a bounding box, overlap of each edge pair making up the markers or even overlap of individual pixels that make up the markers. The results of the correspondence calculations form a 2-D array of scores for potential correspondences. The maximum score along each row in the matrix is the best possible correspondence for each marker in the left image. The maximum score along each column in the matrix is the best possible correspondence for each marker in the right image. If a particular correspondence is a maximum along its row and column then it is considered a valid correspondence.

Once all the valid correspondences are obtained, the 3-D computation is performed. For each set of markers, one in the left image and one in the right image, edge pairs are considered one by one corresponding to each row. The disparity of the center of the edge pair is computed between the two images. If, for example, y were the row value, (x/1, y) and (x/2, y) was the edge pair in the marker in the left image (at that row) and (xr1,y) and (xr2,y) in the marker in the right image (at the same row) then disparity d is:

$$d = abs\left(\frac{(xl1 + xl2)}{2} - \frac{(xr1 + xr2)}{2}\right)$$

The 3-D point transformation is then obtained for the center point of each reference image by standard perspective geometry equations:

$$\left(\frac{(xr1 + xr2)}{2}, y, d\right) \Rightarrow (X, Y, Z)$$

A filtering step determines which markers should be ignored for being located too far to the left or right. Markers that do not have adequate contrast are also ignored. Markers having edge pairs whose average gradient angles are not close to 180 degrees apart are also eliminated from further consideration. 3D information defining the center points of edge pairs is determined from the surviving lane markers, i.e., the list of edge points that constitute lane markers.

The center of mass is determined by calculating a mean vector (m) from a set of three dimensional vectors $vi=[Xi, Yi, Zi]$, where $i=1,2, \ldots n$. Thus, the center of mass, $m=(v1+v2+ \ldots v_n)/n$.

An n x 3 matrix (A) is defined where each row of matrix, A, corresponds to a vector vi. A covariance matrix of A (cov(A)) is defined as $cov(A)=A'*A$. The covariance matrix is sometimes also called a scatter matrix or dispersion matrix. The cosine (slope) of the best fit line connecting centers of mass (m) is obtained by finding the eigenvectors and eigenvalues of the covariance matrix. The eigenvectors and eigenvalues are obtained by performing singular value decomposition. The eigenvectors of the covariance matrix correspond to dispersions in the orthogonal direction. The eigenvalues of the matrix define the magnitude of the corresponding dispersion. Therefore, a 3D set of points that corresponds to a line corresponds to two small eigenvalues and one large eigenvalue. This is the best fit line in a least squared perpendicular sense. Alternatively, a line fitting technique may be used.

The two lane markers nearest to the subject vehicle are selected by sorting the list of lane marker edges to find those lane markers with the largest size which also correspond to those most nearly parallel to the Z axis in the image coordinate system, which also helps to constrain the angles of the two lines in image coordinates. Each lane marker is classified as a right or left lane marker by determining whether the x coordinate of its center of mass is positive or negative. After determining the two nearest lane markers, the list of lane marker edges are evaluated to select the lane markers that are in line with (oriented the same way as) the nearest two lane markers.

Two sets are initialized, a left set and a right set, each having one of the two nearest lane markers appended to it. Other markers are considered and appended to either set if certain criteria are satisfied. Potential left and right lane markers are evaluated by looping through the remaining markers. First the center of mass of the marker under consideration is connected by a line to the center of mass of the previous (last) marker in the set. The angle between this line and the principal axis of the previous marker is evaluated. If the angle is sufficiently small then the marker under consideration is associated with the particular set, i.e., it is part of the same line of markers.

Specifically, each lane marker is evaluated to determine whether it belongs to the set of left or right lane markers. To test for inclusion in the set of left lane markers, for example, a vector (v) is constructed from the marker under consideration to the left lane marker obtained from the previous step. This vector is projected along the direction cosine (dc) of the previously obtained left marker by taking the dot product: $v \cdot dc$. The error (c) is obtained by subtracting the projected vector, $(v \cdot dc)*dc$, from vector (v), yielding $(c=v-(v \cdot dc)*dc)$. If the resulting magnitude of c is large then the lane marker under consideration is not likely to belong to the set of left lane markers.

The same procedure is repeated to evaluate the set of right lane markers.

A lane width threshold criterion is used to resolve ambiguity in associating lane markers to the two bounding sets. A Lane Dynamic Threshold Component 64 determines a threshold lane width 20 in a manner that is directly analogous to determining the lane marker width threshold. A Lane Width Dynamic Threshold Table 56 is pre-computed and communicated to the Lane Detector Component 54. The Lane Detector Component 54 compares a computed lane width for a given image row with the threshold lane width to confirm that a lane marker belongs in a particular set.

All of the data defining the subject vehicle's lane is available to a Lane Modeling component 60. If 3D coordinates are known, a plane can be fit to the ground plane and a curve can be obtained in 3D.

It will be apparent to one of ordinary skill in the art that any number of feature edge detection methods may be substituted for the Feature Detection Component as described herein in terms of an illustrative embodiment. Such other feature detection components may be part of other apparatus involved in vehicle navigation, i.e. cruise control or obstacle avoidance.

Although an illustrative embodiment is described herein in terms of connecting a plurality of lane markers, persons of ordinary skill in the art will also recognize that a solid continuous lane marker may also be detected and used to define a lane according to the present invention.

Furthermore, although an illustrative embodiment is described in terms of defining a lane by considering markers on each side of the lane, it should be apparent that a single line can be detected with respect to a vehicle and used to define a lane according to the invention.

Illustrative embodiments of this apparatus and method disclosed herein are discussed in terms of detecting road lane markers. It is envisioned, however, that the invention disclosed herein is applicable to a wide variety of machine vision systems to sort objects of a particular quality from all objects in an image, according to width, orientation, alignment, and other criteria described herein.

It should be apparent that additional processing components, i.e. shadow elimination components, and binocular channel processing components, may be appended to the image processing components described herein without departing from the spirit and scope of the invention.

Although embodiments according to the present invention incorporate blocks or functional components implemented as code (i.e., software) running on a general purpose computer, it should be appreciated that components of an implementation according to the invention can be implemented with specially programmed computing hardware, application specific integrated circuitry, digital signal processors, software or firmware running on general purpose or application-specific hardware or various combinations of the foregoing.

Although the invention is described herein with respect to illustrative embodiments thereof, it will be appreciated that the foregoing and various other changes omissions and additions in the form of detail thereof may be made without departing from the spirit and scope of the invention.

What is claimed is:

1. A method for detecting road lane markers in an electronically stored image, said method comprising the steps of:
   capturing with an image acquisition device an image including road lane markers, said image comprising a plurality of image pixel;
   determining an expected lane marker width in pixels within said image using perspective geometry, said expected lane marker width depending on a corresponding height within said image;
   generating a list of feature edges within said image;
   computing a set of peel intensity gradient values surrounding said feature edges;
   determining a directional angle of maximum gradient corresponding to each of said feature edges;
   sorting said list of feature edge according to their height; and
   generating a list of feature edge pairs fining a predetermined width criterion, a contrast criterion and an orientation criterion.

2. The method according to claim 1 wherein said feature edge pairs fit said predetermined width criterion if a distance in pixels between said feature edge pairs is about equal to said expected lane marker width for a corresponding height of said feature edge pair,
   wherein said feature edge pairs fit said contrast criterion if said directional angle of maximum gradient corresponding to one feature edge of said feature edge pair differs by about 180 degrees from said directional angle corresponding to an other feature edge of said feature edge pair,
   wherein said feature edge pairs fit said orientation criterion if a feature edge having a lower column number in said feature edge pair corresponds to a directional angle of maximum gradient of about between 0 and 90 degrees or about greater than 270 degrees; and
   dividing said list of feature edge pairs into at least one list of feature edges corresponding to specific lane markers.

3. The method according to claim 2 wherein the steps of dividing said list of feature edge pas into at least one list of edges corresponding to specific lane makers further includes the steps of:
   initiating at least one closest lane marker list by appending a feature edge pair having a greatest separation in pixels;
   appending to said at least one closest lane marker list feature edge pairs overlapping said previously appended feature edge pair and having a row number about near a row number of said previously appended feature edge pair;
   repeatedly initiating a new list of feature edges corresponding to specific lane markers by appending a feature edge pair not overlapping said previously appended feature edge pair and not having a row number about near a row number of said previously appended feature edge pair; and
   appending to said new list of feature edges corresponding to specific lane markers feature edge pairs overlapping said previously appended feature edge pair and having a row number about near a row number of said previously appended feature edge pairs.

4. The method according to claim 1 wherein said at least one list of feature edges corresponding to specific lane markers is generated by performing the steps of:
   initiating said at least one closest lane marker list by appending a feature edge pair having a greatest separation in pixels;
   appending to said at least one closest lane marker list feature edge pairs overlapping said previously appended feature edge pair and having a row number about near a row number of said previously appended feature edge pair;
   repeatedly initiating a new list of feature edges corresponding to specific lane markers by appending a feature edge pair not overlapping said previously appended feature edge pair and not having a row number about near a row number of said previously appended feature edge pair; and
   appending to said new list of feature edges corresponding to specific lane markers feature edge pairs overlapping said previously appended feature edge pair and having a row number about near a row number of said previously appended feature edge pairs.

5. The method according to claim 1 wherein said list of feature edges is generated using Sobel edge detection.

6. The method according to claim 1 wherein said perspective geometry includes dynamic thresholding.

7. The method according to claim 6 wherein said dynamic thresholding determines expected lane marker widths in pixels ($x_w$) according to height (y) by implementing the steps of:
   determining the lane marker width in pixels ($x_w$) for a bottom most row of said image;
   multiplying said lane marker width in pixels ($x_w$) by a quantity $(y-y_c/y-1-y_c)$ wherein ($y_L$) is an image center row number;
   storing the result ($x_w'$) in a table indexed by height; and
   repeating said multiplying and storing steps by recursively
   operating on calculated lane marker width ($x_w'$) of the previous row.

8. A method for detecting road lane markers defining a road lane in an electronically stored image, said method comprising the steps of:
   generating at least one list of feature edges corresponding to specific lane markers;
   computing and storing a center of mass for each specific lane marker;
   sorting said specific lane markers into potential left lane markers and potential right lane markers wherein potential left lane markers have a center of mass in a left half of slid image and potential right lane markers have a center of mass in a right half of said image;
   selecting a closest potential left lane marker having a most widely separated feature edge pair of said potential left lane markers;
   selecting a closest potential right lane marker having a most widely separated feature edge pairs of said potential right lane markers;
   selecting a set of left lane markers front said potential right lane markers by iteratively:
   selecting each potential left lane marker,
   constructing a first vector between a center of mass of said potential left lane marker and a center of mass of a previously selected left lane marker, and
   selecting a left lane marker having a minimum length component of said first vector orthogonal to a direction cosine of said previously selected left lane marker;

selecting a set of right lane markers from said potential right lane markers by iteratively:
  selecting each potential right lane marker,
  constructing a first vector between a center of mass of said potential right lane marker and a center of mass of a previously selected right lane marker, and
  selecting a right lane marker having a minimum length component of said first vector orthogonal to a direction cosine of said previously selected right lane marker.

9. The method according to claim 8 wherein said step of computing and storing a center of mass for each of specific lane markers further comprises, the steps of:
  calculating three dimensional coordinates in a world coordinate system for each edge pair of said specific lane marker; and
  calculating and storing the mean coordinate in each dimension of all edge pairs of said specific lane marker.

10. The method according to claim 8 further comprising the steps of:
  determining an expected lane width in pixels using dynamic thresholding, said expected lane width depending on a corresponding row number of a center of mass of a left lane marker and a center of mass of a corresponding right lane marker;
  computing a separation in pixels between said center of mass for said left lane marker and said center of mass for said corresponding right lane marker;
  confirming that said left lane marker and said corresponding right lane marker define boarders of a road lane by comparing said separation in pixels to said expected lane with in pixels.

11. A method for detecting a road lane in an electronically stored image, said method comprising the steps of:
  detecting road lane markers defying a road lane;
  fitting a first three dimensional curve along centers of mass of a set of left lane markers; and
  fitting a second three dimensional curve along centers of mass of a set or right lane markers.

12. The method according to claim 11 wherein the steps of fitting a first three dimensional curve and fitting a second three dimensional curve further comprise the steps of:
  constructing an n times three matrix wherein each of n rows comprise three dimensional coordinates of each of n centers of mass of each of said left lane markers;
  constructing a first covariance matrix corresponding to said n times three matrix;
  calculating eigenvectors and eigenvalues of said first covariance matrix;
  using said eigenvectors and eigenvalues of said first covariance matrix to determine a least square perpendicular fit of said n centers of mass to a left lane boundary curve;
  constructing an m times three matrix wherein each of m rows comprise three dimensional coordinates of each of m centers of mass of each of said right lane markers;
  constructing a second covariance matrix corresponding to said m times three matrix;
  calculating eigenvectors and eigenvalues of said second covariance matrix; and
  using said eigenvectors and eigenvalues of said second covariance matrix to determine a least square perpendicular fit of said m centers of mass to a right lane boundary curve.

13. A method for detecting a road lane in an electronically stored image, said method comprising she steps of:
  capturing with an image acquisition device an image including road lane markers, said image comprising a plurality of image pixels;
  determining an expected lane marker width in pixels within said image using perspective geometry by,
    determining the lane marker width in pixels ($x_w$) for a bottom most row of said image
    multiplying said lane marker width in pixels ($x_w$) by a quantity (y-$y_{70}$/y-1-y$\zeta$) wherein ($y_{70}$) is an image center row number,
    storing the result ($x_w'$) in a table indexed by row number,
    repenting said multiplying and storing steps by recursively operating on calculated lane marker width ($x_w'$) of the previous row,
    said expected lane marker width depending on a corresponding pixel row number within said image;
  generating a list of feature edges within said image;
  computing and storing a set of pixel intensity gradient values surrounding said feature edges;
  determining and storing a directional angle of maximum gradient corresponding to each of said feature edges;
  sorting and storing said list of feature edges according to their image row number;
  generating a list of feature edge pairs fitting a first criterion, a second criterion and a third criterion,
  wherein said feature edge pairs fit said first criterion if a distance in pixels between said feature edge said is about equal to said expected lane marker width for a corresponding pixel row number of said feature edge pair,
  wherein said feature edge pass fit said second criterion if said directional angle of maximum gradient corresponding to one feature edge of said feature edge pair differs by about 180 degrees from said directional angle corresponding to an other feature edge of said feature edge pair,
  wherein said feature edge pairs fit said third criterion if a feature edge having a lower column number in said feature edge pair corresponds to a directional angle of maximum gradient of about between 0 and 90 degrees or about greater than 270 degrees;
  initiating at least one closest lane marker list by appending a feature edge pair having a greatest separation in pixels;
  appending to said at least one closest line marker list feature edge pairs overlapping said previously appended feature edge pair and having a row number about near a row number of said previously appended feature edge pair;
  repeatingly initiating a new list of feature edges corresponding to specific lane markers by appending a feature edge pair not overlapping said previously appended feature edge pair and not having a row number about near a row number of said previously appended feature edge pair; and
  appending to said new list of feature edges corresponding to specific lane markers feature edge pairs overlapping said previously appended feature edge pair and having a row number about near a row number of said previously appended feature edge pairs;
  calculating three dimensional coordinates in a world coordinate system for each edge pair of said specific lane marker; and calculating and storing the mean coordinate in each dimension of all edge pairs of said specific lane marker as a center of mass;

sorting said specific lane markers into potential left lane markers and potential right lane markers wherein potential left lane markers have a center of mass in a left half of said image and potential right lane markers have a center of mass in a right half of said image;

selecting a closest potential left lane marker having a most widely separated feature edge pair of said potential left lane markers;

selecting a closest potential right lane marker having a most widely separated feature edge pairs of said potential right lane markers;

selecting a set of left lane markers from said potential right lane markers by iteratively:
  selecting each potential left lane marker,
  constructing a first vector between a center of mass of said potential left lane marker and a center of mass of a previously selected left lane marker, and
  selecting a left lane marker having a minimum length component of said first vector orthogonal to a direction cosine of said previously selected left lane marker;

selecting a set of right lane markers from said potential right lane markers by iteratively:
  selecting each potential right lane marker,
  constructing a first vector between a center of mass of said potential right lane marker and a center of mass of a previously selected right lane marker, and
  selecting right lane marker having a minimum length component of said first vector orthogonal to a direction cosine of said previously selected right lane marker;

determining an expected lane width in pixels using dynamic thresholding, said expected lane width depending on a corresponding row number of a center of mass of a left lane marker and a center of mass of a corresponding right lane marker;

computing a separation in pixels between said center of mass for said left lane marker and said center of mass for said corresponding right lane marker;

confirming that said left lane marker and said corresponding right lane marker define boarders of a road lane by comparing said separation in pixels to said expected lane with in pixels;

constructing an n times three matrix wherein each of n rows comprise three dimensional coordinates of each of n centers of mass of each of said left lane markers;

constructing a first covariance matrix corresponding to said n times three matrix;

calculating eigenvectors and eigenvalues of said first covariance matrix;

using said eigenvectors and eigenvalues of said first covariance matrix to determine a least square perpendicular fit of said n centers of mass to a left lane boundary curve;

constructing an m times three matrix wherein each of m rows comprise three dimensional coordinate; of each of m centers of mass of each of said right lane markers, constructing a second covariance matrix corresponding to said m times three matrix;

calculating eigenvectors and eigenvalues of said second covariance matrix, and using said eigenvectors and eigenvalues of said second covariance matrix to determine a least square perpendicular fit of said in centers of mass to a right lane boundary curve.

14. A method of determining correspondence between lane markers in a pair of images comprising the steps of:
  comparing each lane marker in a first image to each lane marker in a second image so that all possible combinations of lane markers are compared, the comparing step comprising;
    constructing a matrix that defines every possible combination of lane marker pairs wherein lane markers of a first image define matrix columns and lane markers of a second image define matrix rows;
    computing a score for each possible correspondence based upon the overlap between lane markers; and
    identifying a valid correspondence as having a maximum score in its matrix row and its matrix column.

15. A method of computing 3D coordinates of corresponding lane marker edges comprising the steps of:
  computing a disparity (d) between centers of lane marker edge pairs in each pair of corresponding lane marker edges according to the equation:

$$d = abs\left(\frac{(xl1+xl2)}{2} - \frac{(xr1+xr2)}{2}\right)$$

wherein (x/1, y) and (x/2, y) are a respective pair of image coordinates of an edge pair in a first image and wherein (xr1, y) and (xr2, y) are a respective pair of image coordinates of an edge pair in a second image; and computing a 3D transformation according to the relation:

$$\left(\frac{(xr1+xr2)}{2}, y, d\right) \Rightarrow (X, Y, Z)$$

* * * * *